(12) United States Patent
Zhang et al.

(10) Patent No.: US 11,655,054 B2
(45) Date of Patent: May 23, 2023

(54) ELECTROMAGNETIC RELEASE DEVICE FOR USE IN VERTICAL FALLING TESTS OF TRI-ROTOR UAVS

(71) Applicants: Yongjie Zhang, Shaanxi (CN); Yingjie Huang, Shaanxi (CN); Zhiwen Li, Shaanxi (CN); Kang Cao, Shaanxi (CN); Yazhou Guo, Shaanxi (CN); Yafeng Wang, Shaanxi (CN)

(72) Inventors: Yongjie Zhang, Shaanxi (CN); Yingjie Huang, Shaanxi (CN); Zhiwen Li, Shaanxi (CN); Kang Cao, Shaanxi (CN); Yazhou Guo, Shaanxi (CN); Yafeng Wang, Shaanxi (CN)

(73) Assignee: Northwestern Polytechnical University, Xi'an Shaanxi (CN)

( * ) Notice: Subject to any disclaimer, the term of this patent is extended or adjusted under 35 U.S.C. 154(b) by 143 days.

(21) Appl. No.: 17/372,423

(22) Filed: Jul. 10, 2021

(65) Prior Publication Data

US 2022/0219837 A1 Jul. 14, 2022

(30) Foreign Application Priority Data

Jan. 8, 2021 (CN) .......................... 202110063585.1

(51) Int. Cl.
| | |
|---|---|
| *H01F 7/20* | (2006.01) |
| *B64F 5/60* | (2017.01) |
| *B64C 39/02* | (2023.01) |
| *G01M 7/08* | (2006.01) |
| *B64U 30/20* | (2023.01) |

(52) U.S. Cl.
CPC .............. *B64F 5/60* (2017.01); *B64C 39/024* (2013.01); *G01M 7/08* (2013.01); *H01F 7/20* (2013.01); *B64U 30/20* (2023.01)

(58) Field of Classification Search
CPC ..... B64F 5/60; B64C 39/02; B64C 2201/108; B64C 39/024; H01F 7/20; G01M 7/08
USPC ......................................................... 73/12.01
See application file for complete search history.

(56) References Cited

U.S. PATENT DOCUMENTS

| | | | |
|---|---|---|---|
| 8,353,199 B1 * | 1/2013 | Ma .......................... | F16M 11/14 248/163.1 |
| 8,421,569 B1 * | 4/2013 | He ........................... | H01F 7/202 335/284 |
| 9,837,205 B2 * | 12/2017 | Rooyakkers ............. | H01F 38/14 |
| 10,224,676 B2 * | 3/2019 | Hemmerlein .... | G01R 33/34007 |

(Continued)

*Primary Examiner* — Peter J Macchiarolo
*Assistant Examiner* — Mohammed E Keramet-Amircolai

(57) ABSTRACT

The present disclosure relates to the technical field of unmanned aerial vehicle (UAV) tests, and more particularly, to an electromagnetic release device for use in vertical falling tests of tri-rotor UAVs and including a mounting frame and multiple clamping and release modules arranged on the mounting frame. movable kits, which include a ferromagnetic plate matching and connected with the electromagnetic adsorption assembly, one end of the ferromagnetic plate is hinged with the electromagnet mounting frame, and the other end of the ferromagnetic plate is connected with the UAV connecting plate; The present disclosure uses electromagnetic control to accurately control the simultaneous opening of three clamping and release modules of a UAV, realizes the release and landing of the UAV in a horizontal status, and is characterized by simple structure and easy operation.

6 Claims, 2 Drawing Sheets

(56) References Cited

U.S. PATENT DOCUMENTS

| | | | |
|---|---|---|---|
| 2010/0294019 A1* | 11/2010 | Lee | G01M 7/08 |
| | | | 73/12.09 |
| 2013/0034834 A1* | 2/2013 | Lee | G09B 9/48 |
| | | | 434/45 |
| 2017/0253330 A1* | 9/2017 | Saigh | B64C 39/024 |
| 2017/0355469 A1* | 12/2017 | Canning | B64C 39/024 |
| 2020/0349852 A1* | 11/2020 | DiCosola | G06Q 10/0832 |

* cited by examiner

ELECTROMAGNETIC RELEASE DEVICE FOR USE IN VERTICAL FALLING TESTS OF TRI-ROTOR UAVS

TECHNICAL FIELD

The present disclosure relates to the technical field of UAV tests, and more particularly, to an electromagnetic release device for use in vertical falling tests of tri-rotor UAVs.

BACKGROUND

At present, the range of applications of civilian UAVs becomes wider and wider, such as UAV aerial photography, UAV plant protection, and UAV express delivery, providing conveniences for the life of people. However, the number of UAV accidents is also increasing.

In order to minimize the damage to the UAVs in an accident, it is necessary to conduct a strength verification test for the UAVs at the UAV design stage to ensure that the UAVs have sufficient strength. One of the tests is the vertical falling tests of UAVs. In the current vertical falling tests of UAVs, the UAV is restrained by ropes during the falling, so it is difficult to simulate the real scenario of free falling, and the stress state and measured data do not fit the reality.

SUMMARY

In view of this, the present disclosure provides an electromagnetic release device for use in vertical falling tests of tri-rotor UAVs to solve the above-mentioned technical problems.

Technical solution of the present disclosure:

An electromagnetic release device for use in vertical falling tests of tri-rotor UAVs, which includes:

a mounting frame;

multiple clamping and release modules, which are respectively arranged on the mounting frame, provide supporting force for the UAV before the test, simultaneously release during the test to quickly remove the supporting force for the UAV, and include:

fixed kits, which include an electromagnet mounting frame fixedly connected with the mounting frame, and the end of the electromagnet mounting frame away from the mounting frame is equipped with an electromagnetic adsorption assembly;

movable kits, which include a ferromagnetic plate matching and connected with the electromagnetic adsorption assembly, one end of the ferromagnetic plate is hinged with the electromagnet mounting frame, the other end of the ferromagnetic plate is connected with one end of a connecting plate, and the other end of the connecting plate is connected with a UAV connecting plate; and a fine-tuning mechanism, which is arranged on the movable kits and used for adjusting the position of the UAV connecting plate.

Preferably, the fine-tuning mechanism includes:

the primary tuning assembly, which is arranged between the ferromagnetic plate and the connecting plate and used for adjusting the UAV connecting plate back and forth; and the secondary tuning assembly, which is arranged between the connecting plate and the UAV connecting plate and used for adjusting the UAV connecting plate left and right.

Preferably, the primary tuning assembly includes at least one primary bolt, the primary bolts are correspondingly threaded through the primary mounting holes and rest in the primary straight slots, the primary straight slots are cut on the ferromagnetic plate, the lengthwise direction of the primary straight slots is the same as that of the ferromagnetic plate, the primary mounting holes are cut on the connecting plate, and the positions of the primary mounting holes shall match those of the primary straight slots.

Preferably, the secondary tuning assembly includes at least one secondary bolt, the secondary bolts are correspondingly threaded through the secondary mounting holes and rest in the secondary straight slot, the secondary straight slot is cut on the UAV connecting plate, the lengthwise direction of the secondary straight slot is perpendicular to that of the ferromagnetic plate, the secondary mounting holes is cut on the connecting plate, and the positions of the secondary mounting holes shall match that of the secondary straight slot.

Preferably, the electromagnetic adsorption assembly includes electromagnets, and the electromagnets are detachably connected with the electromagnet mounting frame.

A test method using the electromagnetic release device for use in vertical falling tests of tri-rotor UAVs, which includes the following steps:

Use the mounting frame to install the entire testing apparatus in the laboratory;

Turn on the power supply for the electromagnetic adsorption assembly on multiple clamping and release modules, manually raise the movable kits, and put the ferromagnetic plate on the electromagnetic adsorption assembly;

Hang the UAV on the UAV connecting plate at the front end of the clamping and release modules. If it is impossible to install the UAV in a proper position, adjust by the fine-tuning mechanism, until the UAV is correctly hung on the UAV connecting plate; and Turn off the power supply for the electromagnetic adsorption assembly on multiple clamping and release modules, thus making the UAV fall off from the UAV connecting plate in a horizontal status and finally land in a horizontal status.

The present disclosure provides an electromagnetic release device for use in vertical falling tests of tri-rotor UAVs, which can raise the UAV in a horizontal status during the test, uses electromagnetic control to accurately control the simultaneous opening of three clamping and release modules of the UAV, and realizes the release and landing of the UAV in a horizontal status. The structure of the device is simple, no added mass is applied on the UAV during the test, and the UAV is not restrained by any ropes during the falling. The device is characterized by low overall economic cost, safety, reliability, and strong practicality, so it is worthy of popularization.

DETAILED DESCRIPTION OF THE PREFERRED EMBODIMENTS

The present disclosure provides an electromagnetic release device for use in vertical falling tests of tri-rotor UAVs. The present disclosure is described below in conjunction with the structural views illustrated in FIG. 1 to FIG. 5.

Embodiment 1

Figure 1:
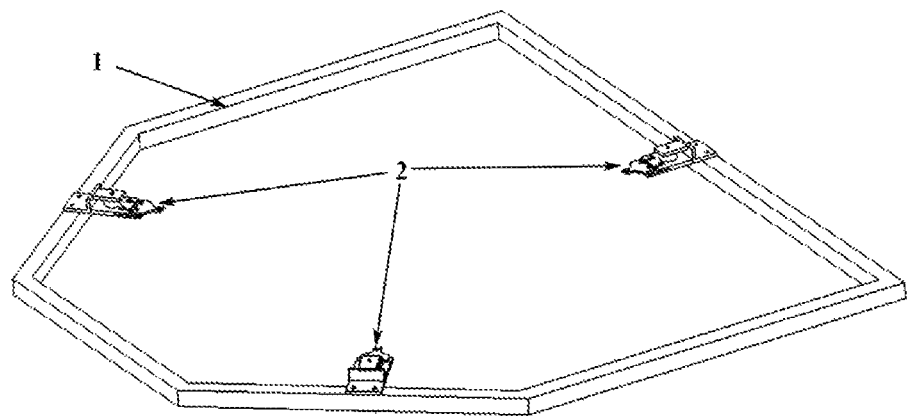
FIG. 1 is a structural view of an electromagnetic release device for use in vertical falling tests of tri-rotor UAVs in the present disclosure.
Figure 2:
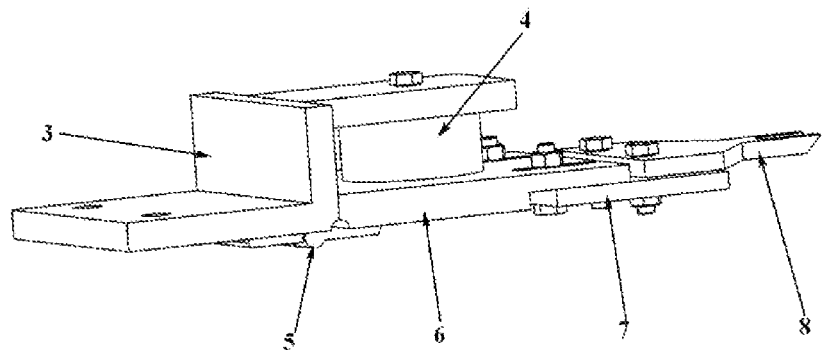
FIG. 2 is a structural view of the clamping and release modules in the present disclosure.
Figure 3:
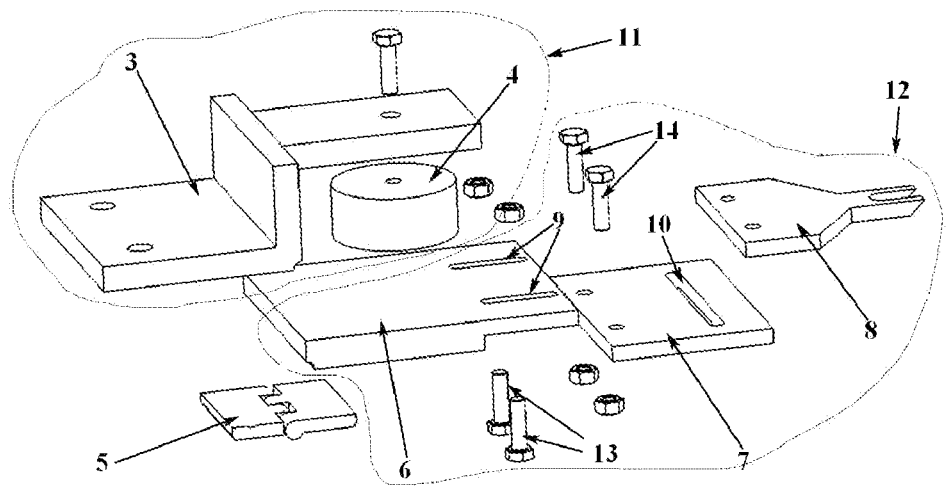
FIG. 3 is an exploded view of the clamping and release modules in the present disclosure.
Figure 4:
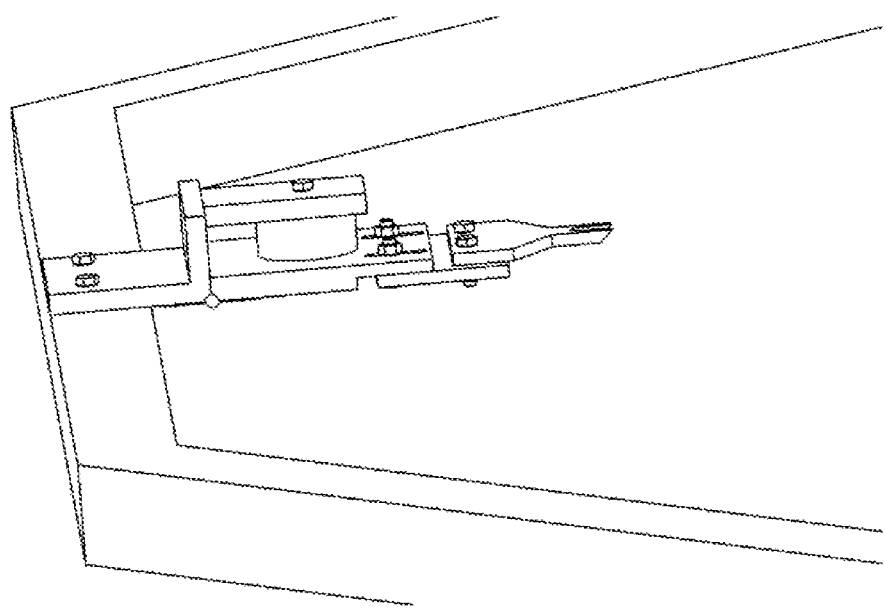
FIG. 4 is a partial view of the power-on state of the electromagnetic release device for use in vertical falling tests of tri-rotor UAVs in the present disclosure.
Figure 5:
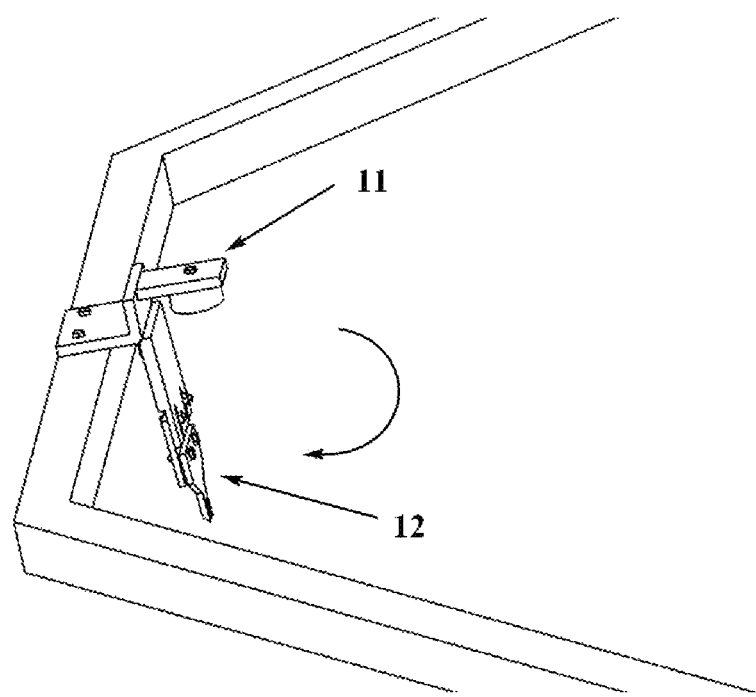
FIG. 5 is a partial view of the power-off state of the electromagnetic release device for use in vertical falling tests of tri-rotor UAVs in the present disclosure.

Among FIG. 1 to FIG. 5, FIG. 1 is a structural view of the electromagnetic release device for use in vertical falling tests of tri-rotor UAVs in the present disclosure, FIG. 2 is a structural view of the clamping and release modules, FIG. 3 is an exploded view of the clamping and release modules in the present disclosure, FIG. 4 is a partial view of the power-on state of the electromagnetic release device for use in vertical falling tests of tri-rotor UAVs, and FIG. 5 is a partial view of the power-off state of the electromagnetic release device for use in vertical falling tests of tri-rotor UAVs.

The present disclosure provides an electromagnetic release device for use in vertical falling tests of tri-rotor UAVs, the specific structure of which includes a mounting frame 1 and multiple clamping and release modules 2, as illustrated in FIG. 1. The mounting frame 1 is an enclosed frame structure used for installing the clamping and release modules 2 and installing the entire test device in the laboratory. Multiple clamping and release modules 2 are respectively arranged on the mounting frame 1 to provide supporting force for the UAV before the test, and simultaneously release during the test to quickly remove the supporting force for the UAV. Multiple clamping and release modules 2 use parts other than the clamping and release modules on the mounting frame 1 to install the electromagnetic release device of the tri-rotor UAV on other devices in the laboratory.

As illustrated in FIG. 2 and FIG. 3, the clamping and release modules 2 include two parts, i.e. fixed kits 11 and movable kits 12. The fixed kits 11 and the movable kits 12 are connected by a hinge 5. The fixed kits 11 include an electromagnet mounting frame 3 and electromagnets 4, and the electromagnets 4 are fixed by bolts onto one end of the electromagnet mounting frame 3. The movable kits 12 include a ferromagnetic plate 6, a connecting plate 7, and a UAV connecting plate 8. One end of the ferromagnetic plate 6 is fixed with one end of the hinge 5, and the other end of the hinge 5 is fixed with the electromagnet mounting frame 3. The primary tuning assembly is arranged between the ferromagnetic plate 6 and the connecting plate 7 and used for adjusting the position of UAV connecting plate 8 back and forth. The primary tuning assembly includes at least one primary bolts 13, the primary bolts 13 are correspondingly threaded through the primary mounting holes and rest in the primary straight slots 9, the primary straight slots 9 are cut on the ferromagnetic plate 6, the lengthwise direction of the primary straight slots 9 is the same as that of the ferromagnetic plate 6, the primary mounting holes are cut on the connecting plate 7, and the positions of the primary mounting holes shall match those of the primary straight slots 9. The secondary tuning assembly is arranged between the connecting plate 7 and the UAV connecting plate 8 and used for adjusting the UAV connecting plate 8 left and right. The secondary tuning assembly includes at least one secondary bolt 14, the secondary bolts 14 are correspondingly threaded through the secondary mounting holes and rest in the secondary straight slot 10, the secondary straight slot 10 is cut on the connecting plate 7, the lengthwise direction of the secondary straight slot 10 is perpendicular to that of the ferromagnetic plate 6, the secondary mounting holes are cut on the connecting plate 8, and the positions of the secondary mounting holes shall match that of the secondary straight slot 10. The primary straight slots 9 can adjust the coincidence degree of the connecting plate 7 and the ferromagnetic plate 6, and the secondary straight slot 10 can adjust the coincidence position of the UAV connecting plate 8 and the connecting plate 7, finally realizing the fine tuning of the position of UAV connecting plate 8. One end of the connecting plate 7 is connected to the ferromagnetic plate 6 by the primary bolts 13 inserted in the primary straight slots 9. The other end of the connecting plate 7 is connected to the UAV connecting plate 8 by the secondary bolts 14 inserted in the secondary straight slot 10.

The mounting frame in the present disclosure is designed according to different UAVs, which cannot be understood as a limitation on the present disclosure.

The electromagnets 4 are fixed onto the electromagnet mounting frame 3 by bolts. In both power-on and power-off states of the electromagnets 4, the fixed kits 11 remain stationary, and three electromagnets 4 are under the centralized control by one switch.

When the electromagnets 4 are in the power-on state, as illustrated in FIG. 4, the electromagnets 4 attract the movable kits 12 and keep them in the horizontal state. When the electromagnets 4 are in the power-off state, as illustrated in FIG. 5, the movable kits 12 disengage from the electromagnets 4 by the hinge 5, but since they are connected with the fixed kits 11, they will not fall off.

The movable kits 12 are equipped with a fine-tuning mechanism that can realize the adjustment of the UAV connecting plate 8 back and forth as well as left and right, thus ensuring that the UAV can still be accurately clamped and released by the fine-tuning mechanism even if there are machining and installation errors for various parts.

The front end of the ferromagnetic plate 6 is equipped with two primary straight slots 9 as the bolt connection holes for the ferromagnetic plate 6 and the connecting plate 7, and the tuning of UAV connecting plate 8 back and forth is realized by tightening the bolts at different positions. The front end of the connecting plate is equipped with one secondary straight slot 10 as the bolt connection hole for the UAV connecting plate 8 and the connecting plate 7, and the tuning of UAV connecting plate 8 left and right is realized by tightening the bolts at different positions. The UAV connecting plate 8 has different designs for different types of UAVs, as long as it can be connected with the end of the UAV arm in the form of suspension. The UAV connecting plate in the figure is only an example, which cannot be understood as a limitation on the present disclosure.

The steps in the test are as follows. Step I: Use the mounting frame 1 to install the entire testing apparatus in the laboratory; the installation method will be determined according to the specific conditions of the test, which cannot be understood as a limitation on the present disclosure. Step II: Use the switch to turn on the power supply for the electromagnets 4 on three fixed kits 11, manually raise the movable kits 12, and make them attracted by the electromagnets 4, as illustrated in FIG. 4. Step III: Hang the UAV on the UAV connecting plate 8 at the front end of the clamping and release modules 2; If it is impossible to install the UAV in a proper position, adjust the positions of the primary bolts 13 and the secondary bolts 14 in the fine-tuning mechanism, until the UAV is correctly hung on the UAV connecting plate 8. Step IV: Use the switch to turn off the power supply for the electromagnets 4, make the three movable kits 12 simultaneously disengage from the electromagnets 4 and fall off around the revolving shaft of the hinge 5, as illustrated in FIG. 5; the UAV falls off from the UAV connecting plate 8 in a horizontal status and finally lands in a horizontal status.

The present disclosure provides an electromagnetic release device for use in vertical falling tests of tri-rotor UAVs, which can raise the UAV in a horizontal status during the test, uses electromagnetic control to accurately control the simultaneous opening of three clamping and release modules of the UAV, and realizes the release and landing of the UAV in a horizontal status. The structure of the device is simple, no added mass is applied on the UAV during the test, and the UAV is not restrained by any ropes during the falling. The device is characterized by low overall economic cost, safety, reliability, and strong practicality, so it is worthy of popularization.

The above disclosure is only the preferred embodiments of the present disclosure, and the embodiments of the present disclosure are not limited to the above embodiments. Any changes that can be thought of by those skilled in the art shall fall into the scope of protection of the present disclosure.

The invention claimed is:

1. An electromagnetic release device for use in vertical falling tests of tri-rotor UAVs, which is characterized in that it includes:
    a mounting frame (1);
    multiple clamping and release modules (2), which are respectively arranged on the mounting frame (1) to provide supporting force for the UAV before the test, simultaneously release during the test to quickly remove the supporting force for the UAV, and include:
    fixed kits (11), which include an electromagnet mounting frame (3) fixedly connected with the mounting frame (1), and the end of the electromagnet mounting frame (3) away from the mounting frame (1) is equipped with an electromagnetic adsorption assembly;
    movable kits (12), which include a ferromagnetic plate (6) matching and connected with the electromagnetic adsorption assembly, one end of the ferromagnetic plate (6) is hinged with the electromagnet mounting frame (3), the other end of the ferromagnetic plate (6) is connected with one end of a connecting plate (7), and the other end of the connecting plate (7) is connected with a UAV connecting plate (8); and
    a fine-tuning mechanism, which is arranged on the movable kits (12) and used for adjusting the position of the UAV connecting plate (8).

2. The electromagnetic release device for use in vertical falling tests of tri-rotor UAVs as claimed in claim 1, which is characterized in that the fine-tuning mechanism includes:
    the primary tuning assembly, which is arranged between the ferromagnetic plate (6) and the connecting plate (7) and used for adjusting the UAV connecting plate (8) back and forth;
    the secondary tuning assembly, which is arranged between the connecting plate (7) and the UAV connecting plate (8) and used for adjusting the UAV connecting plate (8) left and right.

3. The electromagnetic release device for use in vertical falling tests of tri-rotor UAVs as claimed in claim 2, which is characterized in that the primary tuning assembly includes at least one primary bolt (13), the primary bolts (13) are correspondingly threaded through the primary mounting holes and rest in the primary straight slots (9), the primary straight slots (9) are cut on the ferromagnetic plate (6), the lengthwise direction of the primary straight slots (9) is the same as that of the ferromagnetic plate (6), the primary mounting holes are cut on the connecting plate (7), and the positions of the primary mounting holes shall match those of the primary straight slots (9).

4. The electromagnetic release device for use in vertical falling tests of tri-rotor UAVs as claimed in claim 1, which is characterized in that the secondary tuning assembly includes at least one secondary bolt (14), the secondary bolts (14) are correspondingly threaded through the secondary mounting holes and rest in the secondary straight slot (10), the secondary straight slot (10) is cut on the connecting plate (7), the lengthwise direction of the secondary straight slot (10) is perpendicular to that of the ferromagnetic plate (6), the secondary mounting holes are cut on the UAV connecting plate (8), and the positions of the secondary mounting holes shall match that of the secondary straight slot (10).

5. The electromagnetic release device for use in vertical falling tests of tri-rotor UAVs as claimed in claim 1, which is characterized in that the electromagnetic adsorption assembly includes electromagnets (4), and the electromagnets (4) are detachably connected with the electromagnet mounting frame (3).

6. The electromagnetic release device for use in vertical falling tests of tri-rotor UAVs as claimed in claim 1, which is characterized in that the test method includes the following steps:
    Use the mounting frame (1) to install the entire testing apparatus in the laboratory;
    Turn on the power supply for the electromagnetic adsorption assembly on multiple clamping and release modules (2), manually raise the movable kits (12), and make the ferromagnetic plate (6) attracted by the electromagnetic adsorption assembly;
    Hang the UAV on the UAV connecting plate (8) at the front end of the clamping and release modules (2). If it is impossible to install the UAV in a proper position, adjust by the fine-tuning mechanism, until the UAV is correctly hung on the UAV connecting plate (8); and
    Turn off the power supply for the electromagnetic adsorption assembly on multiple clamping and release modules (2), thus making the UAV fall off from the UAV connecting plate (8) in a horizontal status and finally land in a horizontal status.

* * * * *